(12) United States Patent
Henderson et al.

(10) Patent No.: US 12,054,998 B2
(45) Date of Patent: Aug. 6, 2024

(54) PRECISION-CUT CASING TUBULAR FOR CENTRALIZER ASSEMBLY

(71) Applicant: INNOVEX DOWNHOLE SOLUTIONS, INC., Houston, TX (US)

(72) Inventors: Paul Henderson, Houston, TX (US); Ben Griffith, Houston, TX (US); Dale Hamm, Houston, TX (US); Jeffery Kitzman, Houston, TX (US)

(73) Assignee: INNOVEX DOWNHOLE SOLUTIONS, INC., Houston, TX (US)

( * ) Notice: Subject to any disclaimer, the term of this patent is extended or adjusted under 35 U.S.C. 154(b) by 144 days.

(21) Appl. No.: 17/515,876

(22) Filed: Nov. 1, 2021

(65) Prior Publication Data

US 2022/0136340 A1 May 5, 2022

Related U.S. Application Data (60) Provisional application No. 63/107,568, filed on Oct. 30, 2020.

(51) Int. Cl.
| | |
|---|---|
| *B23B 25/06* | (2006.01) |
| *B23B 7/12* | (2006.01) |
| *E21B 17/10* | (2006.01) |

(52) U.S. Cl.
CPC .......... *E21B 17/1028* (2013.01); *B23B 7/12* (2013.01); *B23B 25/06* (2013.01); *B23B 2215/72* (2013.01);
(Continued)

(58) Field of Classification Search
CPC . B23B 25/06; B23B 2215/72; B23B 2265/16; B23B 7/12; B23B 2270/10;
(Continued)

(56) References Cited

U.S. PATENT DOCUMENTS

| | | | |
|---|---|---|---|
| 4,631,973 A | 12/1986 | Eley | |
| 5,238,062 A | 8/1993 | Reinholdt | |

(Continued)

FOREIGN PATENT DOCUMENTS

| | | |
|---|---|---|
| CN | 108291803 A | 7/2018 |
| EP | 3156158 A1 | 4/2017 |

(Continued)

OTHER PUBLICATIONS

Extended European Search Report dated Aug. 24, 2018, EP Application No. 15876047, filed Jun. 29, 2017, pp. 1-7.

(Continued)

*Primary Examiner* — Sara Addisu
(74) *Attorney, Agent, or Firm* — MH2 TECHNOLOGY LAW GROUP, LLP (57) ABSTRACT

A method and downhole tool assembly, of which the method includes measuring a thickness and a location of an outer diameter surface of the tubular at a plurality of transverse planes of the tubular, simulating a cutting process to determine a position for the outer diameter surface of the tubular in a lathe, such that, after the cutting process that was simulated is conducted, the thickness of the tubular is greater than a minimum thickness and an outer diameter defined by the outer diameter surface of the tubular is less than or equal to a maximum diameter, positioning the tubular in the lathe based on the simulation of the cutting process, cutting the outer diameter surface of the tubular to reduce the outer diameter thereof to at most the maximum diameter and thereby form a turned-down region, and positioning the downhole tool on the tubular in the turned-down region.

12 Claims, 10 Drawing Sheets

(52) U.S. Cl.
CPC ....... *B23B 2265/16* (2013.01); *B23B 2270/10* (2013.01)

(58) Field of Classification Search
CPC ....... B23B 5/36; B23B 2260/128; B23B 1/00; E21B 17/1028
See application file for complete search history.

(56) References Cited

U.S. PATENT DOCUMENTS

| | | | |
|---|---|---|---|
| 5,274,574 A * | 12/1993 | Tsujido | G05B 19/4069 |
| | | | 700/173 |
| 5,575,333 A | 11/1996 | Lirette et al. | |
| 6,209,638 B1 | 4/2001 | Mikolajczyk | |
| 6,484,803 B1 | 11/2002 | Gremillion | |
| 6,513,223 B1 | 2/2003 | Angman | |
| 7,140,432 B2 | 11/2006 | Gremillion | |
| 7,182,131 B2 | 2/2007 | Gremillion | |
| 8,397,572 B2 * | 3/2013 | Bellin | G01N 29/28 |
| | | | 702/41 |
| 8,434,392 B1 * | 5/2013 | Lerner | G01B 21/14 |
| | | | 82/1.11 |
| 10,058,976 B2 | 8/2018 | Stamey | |
| 10,208,511 B2 | 2/2019 | Roger et al. | |
| 10,208,544 B2 * | 2/2019 | Roger | B21D 41/04 |
| 10,525,565 B2 * | 1/2020 | Stamey | B24B 5/355 |
| 10,927,611 B2 | 2/2021 | Roger et al. | |
| 2002/0139537 A1 | 10/2002 | Young | |
| 2003/0070803 A1 | 4/2003 | Gremillion | |
| 2003/0150611 A1 | 8/2003 | Buytaert | |
| 2005/0241822 A1 | 11/2005 | Gremillion | |
| 2006/0102354 A1 | 5/2006 | Gammage et al. | |
| 2010/0202841 A1 * | 8/2010 | Backhouse | B24B 5/16 |
| | | | 29/402.02 |
| 2011/0030973 A1 | 2/2011 | Jenner | |
| 2012/0145410 A1 | 6/2012 | Levie | |
| 2012/0267121 A1 | 10/2012 | Levie | |
| 2013/0248206 A1 | 9/2013 | Jordan | |
| 2013/0319689 A1 | 12/2013 | Levie et al. | |
| 2013/0333531 A1 * | 12/2013 | Koll | G05B 19/182 |
| | | | 82/1.11 |
| 2014/0367085 A1 | 12/2014 | Levie et al. | |
| 2016/0186505 A1 | 6/2016 | Roger | |
| 2017/0136548 A1 * | 5/2017 | Ochiai | B23Q 15/04 |
| 2018/0264556 A1 * | 9/2018 | Silveira E Silva | G01N 21/954 |
| 2018/0311787 A1 | 11/2018 | Stamey | |
| 2019/0136643 A1 * | 5/2019 | Roger | B21D 39/04 |
| 2021/0125126 A1 * | 4/2021 | Irino | G06Q 50/04 |
| 2021/0172263 A1 * | 6/2021 | Levie | E21B 19/24 |
| 2023/0205163 A1 * | 6/2023 | Kitzman | B23B 25/06 |
| | | | 700/160 |

FOREIGN PATENT DOCUMENTS

| | | |
|---|---|---|
| JP | 2009-080517 A | 4/2009 |
| WO | 00/66874 A1 | 11/2000 |

OTHER PUBLICATIONS

Jin Ho Kim (Authorized Officer), International Search Report and Written Opinion dated Mar. 29, 2016, PCT Application No. PCT/US2015/067351, filed Dec. 22, 2015, pp. 1-17.

Park, Tae Wook (Authorized Officer), International Search Report and Written Opinion dated Feb. 22, 2022, PCT Application No. PCT/US2021/057542, 10 pages.

* cited by examiner

PRECISION-CUT CASING TUBULAR FOR CENTRALIZER ASSEMBLY

CROSS-REFERENCE TO RELATED APPLICATIONS

This application claims priority to U.S. Provisional Patent Application Ser. No. 63/107,568, which was filed on Oct. 30, 2020, and is incorporated herein by reference in its entirety.

BACKGROUND

Oilfield tubulars, such as pipes, drill strings, casing, tubing, etc., may be used to transport fluids or to produce water, oil, and/or gas from geologic formations through wellbores. In various stages of wellbore drilling and completion, such tubulars may be positioned within (i.e., "run-in") the wellbore. During run-in, the oilfield tubulars may be maintained in a generally concentric position within the wellbore, such that an annulus is formed between the oilfield tubular and the wellbore (and/or another, surrounding tubular positioned in the wellbore).

Tools known as "centralizers" are employed to maintain this concentricity of the tubular in the wellbore. A variety of centralizers are used, including rigid centralizers, semi-rigid centralizers, and flexible, bow-spring centralizers. Bow-spring centralizers, in particular, are generally formed from two end collars and flexible ribs that extend between the collars. The ribs are expanded outward, and may be resilient, such that the bow-springs centralizers are capable of centralizing the tubular in the wellbore across a range of wellbore sizes.

Restrictions may exist in the wellbore in which the oilfield tubular is run. These restrictions may be areas where the inner diameter of the wellbore is reduced, which, in turn, reduce the clearance between the oilfield tubular and the wellbore. Examples of restrictions include lining hangers, the inner diameter of another, previously-run casing, and the wellhead inner diameter. When restrictions are present, bow-spring centralizers may be employed, and may be configured to collapse radially toward the oilfield tubular, allowing the centralizer to pass through the restrictions, while continuing to provide an annular standoff.

However, bow-spring centralizers generally have an operating envelope for clearance. When the clearance is too small, the bow-spring centralizers may be damaged when passing through the restriction, which may reduce the ability of the centralizers to provide a standoff below the restriction. Furthermore, oilfield tubulars generally include an amount of tolerance for the outer diameter (e.g., 1%), which can make determining the precise clearance size challenging.

SUMMARY

Embodiments of disclosure provide a method for positioning a downhole tool on a tubular. The method includes measuring a thickness and a location of an outer diameter surface of the tubular at a plurality of transverse planes of the tubular, simulating a cutting process to determine a position for the outer diameter surface of the tubular in a lathe, such that, after the cutting process that was simulated is conducted, the thickness of the tubular is greater than a minimum thickness and an outer diameter defined by the outer diameter surface of the tubular is less than or equal to a maximum diameter, positioning the tubular in the lathe based on the simulation of the cutting process, cutting the outer diameter surface of the tubular so as to reduce the outer diameter thereof to at most the maximum diameter and thereby form a turned-down region, and positioning the downhole tool on the tubular in the turned-down region.

Embodiments of the disclosure also include a downhole tool assembly, including a tubular having a turned-down region and a raised region extending axially away from the turned-down region. An inner diameter surface of the tubular in the turned-down region has a higher ellipticity than an outer diameter surface in the turned-down region, and wherein the outer diameter surface in the turned-down region defines a first center that is offset from a second center defined by the outer diameter surface of the tubular away from the turned-down region. The assembly also includes a cylindrical tool disposed at least partially in the turned-down region.

Embodiments of the disclosure further include a method for positioning a downhole tool on a tubular. The method includes measuring a thickness and a location of an outer diameter surface of the tubular at a plurality of transverse planes of the tubular, simulating a cutting process to determine a first radial position for the tubular at a first transverse plane of the plurality of transverse planes, and a second radial position for the tubular at a second transverse plane of the plurality of transverse planes, the first and second radial positions being radially offset. The first and second radial positions are selected such that, after the cutting process that was simulated is conducted, the thickness of the tubular at the first and second transverse planes is greater than a certain minimum thickness and an outer diameter defined by the outer diameter surface of the tubular is less than or equal to a certain maximum diameter. The method also includes positioning the tubular in a lathe at the first radial position, based on the simulation of the cutting process, cutting the outer diameter surface of the tubular so as to reduce the outer diameter thereof to at most the certain maximum and thereby form a turned-down region, adjusting the position of the tubular, after reaching the first transverse plane, to the second radial location, cutting the outer diameter surface of the tubular after adjusting the position, and positioning the downhole tool on the tubular in the turned-down region.

BRIEF DESCRIPTION OF THE DRAWINGS

The present disclosure may best be understood by referring to the following description and accompanying drawings that are used to illustrate some embodiments. In the drawings.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Figure 1:
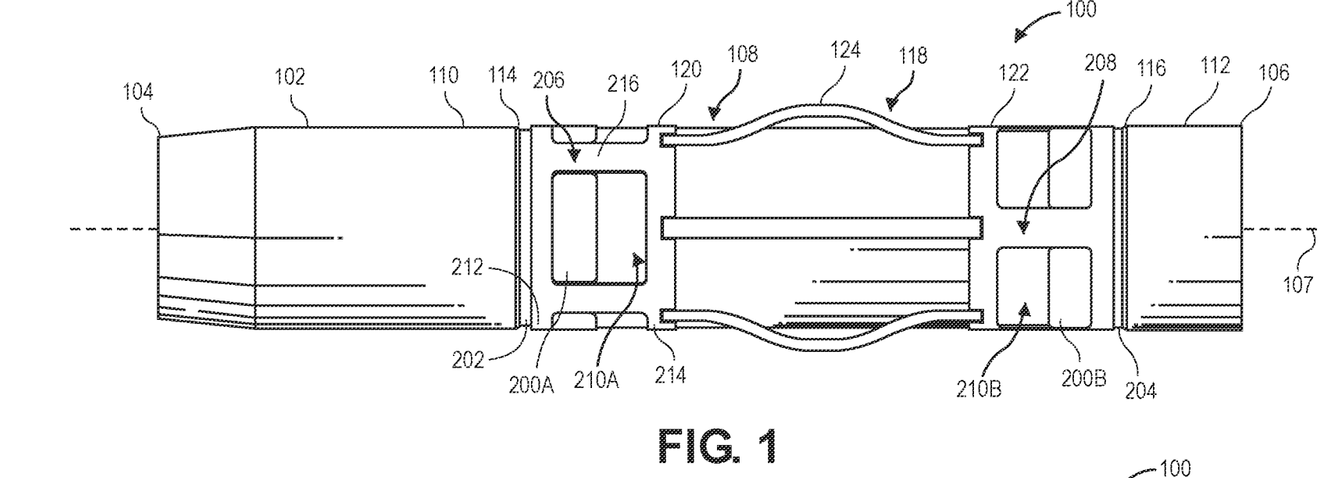
FIG. 1 illustrates a side perspective view of a centralizer assembly, according to an embodiment.

FIG. 1 illustrates a side perspective view of a centralizer assembly 100, according to an embodiment. The centralizer assembly 100 may be employed, for example, to maintain an annular clearance between a casing string (or any other type of oilfield tubular) and a surrounding tubular (e.g., another casing or liner, or the wellbore wall in open-hole situations). The centralizer assembly 100 may be affixed to a tubular 102, which may be casing, drill pipe, or any other tubular that may be run into a well.

In some embodiments, the tubular 102 may be formed from the same casing (or tubular) as a remainder of a string to which the centralizer assembly 100 may be attached. Further, the tubular 102 may have a length comparable (e.g., the same, within tolerance, as) the adjacent casing. In a specific embodiment, the length of the tubular 102 (and the other casing) may be about 40 feet. Moreover, the tubular 102 may be made from the same or a similar material as the remaining casing. In other embodiments, the tubular 102 may be formed from a separate type, material, etc. of pipe, tubing, or the like, and may be longer or shorter than the adjacent casing joints.

Further, the tubular 102 may include a first end 104, a second end 106, and a turned-down region 108 disposed between the first and second ends 104, 106. In an embodiment, the turned-down region 108 may be spaced axially apart (e.g., along a longitudinal axis 107 of the centralizer assembly 100) from the ends 104, 106. In another embodiment, the turned-down region 108 may extend to one of the ends 104, 106. The ends 104, 106 may be configured to be attached to axially-adjacent tubulars. Accordingly, in an embodiment, the first end 104 includes a threaded, pin-end connection, and the second end 106 may include a threaded, box-end connection (not visible in FIG. 1). Although the phrase "turned down" typically refers to parts made by lathing operations, it will be appreciated that other machining operations may be employed to form at least some embodiments of the turned-down region 108.

The tubular 102 may define a radius R and a wall thickness T. The turned-down region 108 may define an area of the tubular 102 where the radius R and the wall thickness T are reduced. In some embodiments, the turned-down region 108 may have a substantially circular outer diameter surface, and a less circular, more ovular, inner diameter. Moreover, the inner and outer diameters of the tubular 102 may not be precisely concentric away from the turned-down region 108, but may be forced to be (at least closer to) concentric in the turned-down region 108 as a result of the machining operations applied thereto. For example, the tubular 102 may begin as conventional casing, which generally is not precisely cylindrical, but has an ovular cross section and potentially eccentric inner and outer diameters. The present embodiments may accommodate these departures from cylindrical, while cutting a minimum amount of the outer diameter surface away from the tubular 102, so as to maintain structural strength and burst ratings for the casing or other tubular 102.

Further, the turned-down region 108 may be formed as a recess in the tubular 102, and thus may be spaced apart from the ends 104, 106, such that the tubular 102 may define two raised regions 110, 112 having larger radii R and wall thickness T than the turned-down region 108. Shoulders 114, 116 may be defined where the raised regions 110, 112 meet or "transition" to the turned-down region 108. The two raised regions 110, 112 may have the same or different outer diameters, which may both be larger than the outer diameter of the turned-down region 108 and/or may be larger than the oilfield tubulars to which the tubular 102 is connected. In some embodiments, however, one or more of the raised regions 110, 112 may be omitted. For example, in some embodiments, the turned-down region 108 may extend to either one of the ends 104, 106, such that the tubular 102 is "skimmed."

The centralizer assembly 100 may also include, for example, a centralizer 118 or another cylindrical tool, which may be disposed at least partially in the turned-down region 108. The centralizer 118 may include at least one end collar. In the illustrated embodiment, the centralizer 118 includes two, axially-offset end collars 120, 122. The surfaces of the end collars 120, 122 that face away from one another (i.e., the outboard surfaces) may define the axial "extents" of the centralizer 118. In an embodiment, the end collars 120, 122 may be disposed on opposite ends of the turned-down region 108, e.g., generally adjacent to the shoulders 114, 116, respectively.

The centralizer 118 may also include a plurality of ribs 124 which may extend axially between and be connected with (e.g., integrally or via welding, fasteners, tabs, etc.) the end collars 120, 122. In some embodiments, the ribs 124 may be flexible, and may be curved radially outwards from the end collars 120, 122. Such curved, flexible ribs 124 may be referred to as "bow-springs." In other embodiments, however, the ribs 124 may take on other forms, in shape and/or in elastic properties. In some embodiments, a coating may be applied to the ribs 124, the end collars 120, 122, and/or the tubular 102. The coating may be configured to reduce abrasion to the ribs 124, end collars 120, 122, the tubular 102, the casing (or another surrounding tubular in which the centralizer 118 may be deployed), or a combination thereof. The coating may, for example, also serve to reduce friction, and thus torque and drag forces, in the wellbore. In other embodiments, the centralizer 118 may be a rigid centralizer.

The centralizer 118 may be formed in any suitable way, from any suitable material. In a specific embodiment, the centralizer 118 may be formed by rolling a flat plate, and then seam welding the flat plate to form a cylindrical blank. The cylindrical blank may then be cut, so as to define the ribs 124 and end collars 120, 122. One such fabrication process may be as described in U.S. Patent Publication No. 2014/0251595, which is incorporated by reference herein in its entirety.

In an embodiment in which the tubular 102 is skimmed (ground or machined down to one of the ends 104, 106), the centralizer 118 may be slid onto the tubular 102 fully assembled. Otherwise, the centralizer 118 may be received laterally onto the tubular 102 at the turned-down region 108 and clamped into place, or temporarily expanded so that it can slide over the non-turned-down region and into the turned-down region 108.

The centralizer assembly 100 may also include a plurality of stop features (e.g., segments) 200A, 200B. The stop segments 200A, 200B may be disposed generally proximal to the shoulders 114, 116, respectively, and may be spaced axially apart from the shoulders 114, 116 so as to define circumferentially-extending channels 202, 204 between the stop segments 200A, 200B and the shoulders 114, 116, respectively. Further, the stop segments 200A may be axially-aligned and separated circumferentially apart so as to define axial channels 206 therebetween. Similarly, the stop segments 200B may be axially-aligned and separated circumferentially apart so as to define axial channels 208 therebetween.

The stop segments 200A, 200B may be positioned between the axial extents of the centralizer 118. In other words, the centralizer 118 may be positioned on both axial sides (i.e., opposing first and second axial sides) of the stop segments 200A, 200B. For example, as shown, the stop segments 200A, 200B may be received at least partially through windows 210A, 210B formed in the end collars 120, 122, respectively.

The end collars 120, 122 may be similar in structure. Referring to the end collar 120 as an example, the end collar 120 may include two offset bands 212, 214, with bridges 216 extending between the bands 212, 214. Adjacent pairs of bridges 216, in addition to the bands 212, 214, may define the windows 210A. The bridges 216 may be configured to slide between, in an axial direction, and bear on, in a circumferential direction, the stop segments 200A. The stop segments 200A and the windows 210A may thus cooperate to permit, as well as limit, an axial and/or circumferential range of motion for the centralizer 118 with respect to the tubular 102. In particular, the bands 212, 214 may be configured to engage the stop segments 200A so as to limit an axial range of motion of the centralizer 118 with respect to the tubular 102.

In some embodiments, the windows 210A may be larger, axially and/or circumferentially (e.g., have a larger axial dimension and/or larger circumferential dimension), than the stop segments 200A received therein. This relative sizing may provide a range of rotational and/or axial movement for the centralizer 118; however, in other embodiments, the windows 210A may be sized to more snugly receive the stop segments 200A, thereby constraining or eliminating movement of the centralizer 118 with respect to the tubular 102.

Moreover, the bands 212, 214 of the end collar 120 may be received into the circumferential channels 202. In some embodiments, engagement between the shoulders 114, 116 and the band 214 may limit an axial range of motion of the centralizer 118 with respect to the tubular 102. For example, an axial range of motion needed to provide for axial expansion of the centralizer 118 during radial collapse of the ribs 124 may be determined, and the spacing of the channels 202, taking into consideration the thickness of the band 214, may be calculated. Further, in some situations, the thickness of the bands 214 may be adjusted.

Figure 2:
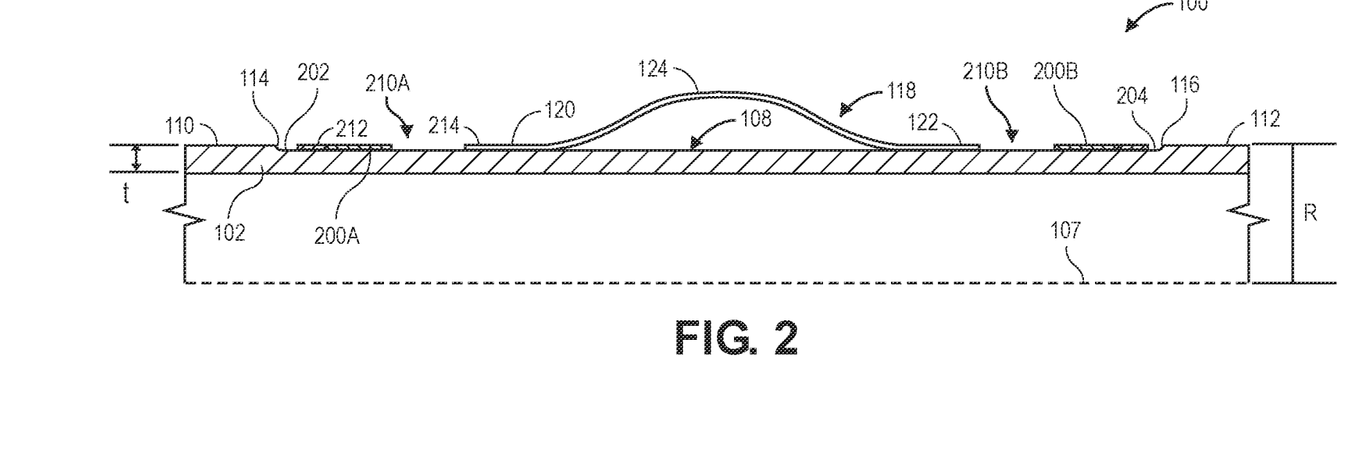
FIG. 2 illustrates a side, cross-sectional view of a portion of a centralizer assembly, according to an embodiment.

FIG. 2 illustrates an enlarged, partial cross-sectional view of the centralizer assembly 100, according to an embodiment. As shown, the centralizer assembly 100 includes the tubular 102 defining the raised regions 110, 112 and the turned-down region 108. The shoulders 114, 116, defined where the turned-down region 108 transitions to the raised regions 110, 112, respectively, may be inclined (e.g., beveled), as shown, so as to form an angle with respect to the longitudinal axis 107. For example, as proceeding away from the stop segments 200A, 200B and/or away from the turned-down region 108, the outer diameter of tubular 102 at the shoulders 114, 116 may increase. The shoulders 114, 116 may be inclined so as to reduce stresses in the transition in diameters. In an embodiment, the shoulders 114, 116 may be disposed at an any angle between about 1° and about 90°, for example, at an angle in the range of from about 1°, about 5°, or about 10° to about 20°, about 25°, about 30°. In a specific example, the shoulders 114, 116 may be inclined at an angle of about 15°.

Further, the shoulders 114, 116 may extend at least as far radially as the end collars 120, 122 and/or the stop segments 200A, 200B. That is, the first diameter of the tubular 102 at the raised regions 110, 112 may be at least as large as the second diameter of the tubular 102 in the turned-down region 108 plus twice the thickness of the end collars 120, 122 (or the stop segments 200A, 200B). Accordingly, the raised regions 110, 112 may protect the edges and end faces of the bands 212, 214 and stop segments 200A, 200B from contact with foreign objects in the wellbore. Since the centralizer 118 may be formed from a relatively thin material (e.g., relative to the tubular 102), the protection by the shoulders 114, 116 may assist in preventing damage to the centralizer 118.

The stop segments 200A, 200B may be formed from a material that is different from the material making up the tubular 102 and may be coupled to the tubular 102 in the turned down region 108 using any suitable process. For example, the stop segments 200A, 200B may be formed from one or more layers of a thermal spray, such as WEARSOX®, which is commercially available from Innovex Downhole Solutions, Inc. In an embodiment, the thermal spray forming the stop segments 200 may be as described in U.S. Pat. No. 7,487,840 or 9,920,412, both of which are incorporated herein by reference in the entirety, to the extent not inconsistent with the present disclosure.

In another embodiment, the stop segments 200A, 200B may be formed from an epoxy injected into a composite shell, such as, for example, described in U.S. Pat. No. 9,376,871, which is incorporated herein by reference in its entirety, to the extent not inconsistent with the present disclosure. For example, in some embodiments, the stop segments 200A, 200B may be formed from an epoxy, a composite, or another molded material connected to the tubular 102.

In still another embodiment, the stop segments 200A, 200B may be made from the same material as the tubular 102 and, e.g., may be integrally-formed therewith. For example, the turned-down region 108 may be formed by grinding around the areas designated for the stop segments 200A, e.g., leaving the channels 202, 206 and forming the shoulder 114. The stop segments 200B and the channels 204, 208 may be similarly formed.

Figure 3:
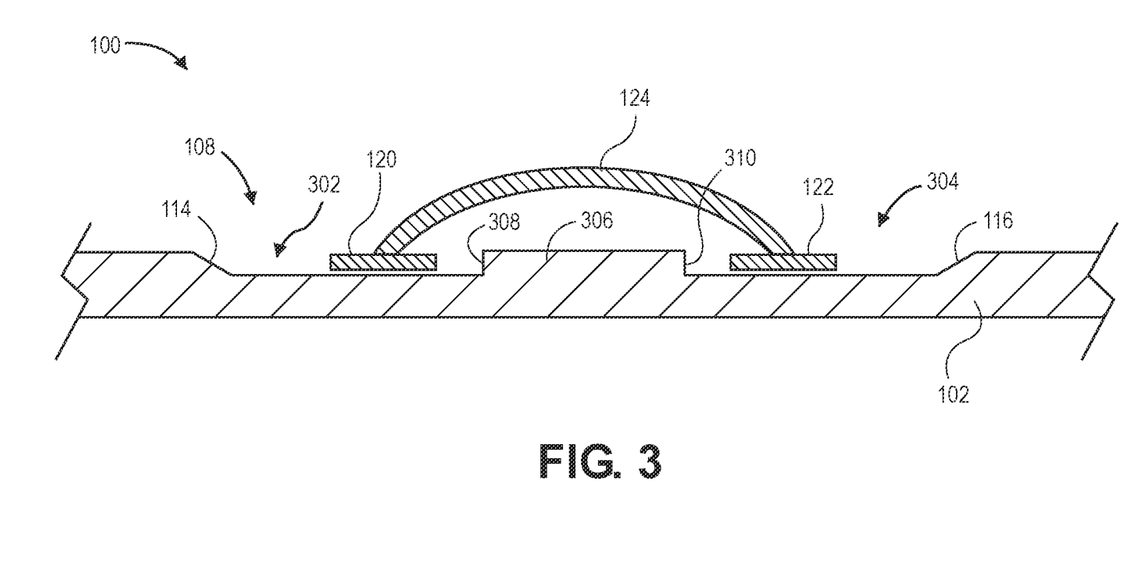
FIG. 3 illustrates a side, cross-sectional view of a portion of another centralizer assembly, according to an embodiment.

FIG. 3 illustrates a side, cross-sectional view of another embodiment of the centralizer assembly 100. In this embodiment, the turned-down region 108 is bifurcated into two turned-down regions 302, 304, which are separated apart axially along the tubular 102 by a medial stop feature (e.g., stop member) 306. The end collars 120, 122 are positioned in the respective turned-down regions 302, 304, as shown, with the ribs 124 extending over the medial stop member 306 and connecting the end collars 120, 122 together. The centralizer 118 may be free to move along a range of motion that is limited by the distance between the shoulder 114 and an end face 308 of the medial stop member 306, and between the shoulder 116 and an end face 310 of the medial stop member 306. This distance may be selected such that the ribs 124 may flex inward to avoid damage in tight restrictions, while flexing outward to engage larger surrounding tubular surfaces. The distances between the end face 308 and the shoulder 114 may be the same or different as the distance between the end face 310 and the shoulder 116. Further, the distances may be selected such that the end collar 120 is prevented from engaging the shoulder 114 by the end collar 122 engaging the end face 310, and likewise, the end collar 122 is prevented from engaging the shoulder 116 by the end collar 120 engaging the end face 308. Thus, in at least one embodiment, the provision of the medial stop member 306, in contrast to the stop segments 200A, 200B may result in the centralizer 118 being at least partially pulled through a restriction, rather than being pushed through.

Additionally, in some embodiments, the end faces 308, 310 may be square, so as to provide a generally axially-oriented force couple with the respective end collars 120, 122 upon engagement therewith. This may avoid wedging the end collars 120, 122 radially outwards, as might occur with beveled or angled end faces 308, 310.

The medial stop member 306 may be formed as an integral part of the tubular 102, i.e., a portion that is not ground down or is ground down less than the turned-down regions 302, 304. In another embodiment, the medial stop member 306 may be formed after grinding down the entire length between the shoulders 114, 116, and then depositing a material, such as a thermal spray metal, epoxy-and-shell combination, a separate metal or composite collar, etc., onto the desired location in the turned-down region 108. Further, in some embodiments, the stop member 306 may be partially created by grinding down the adjacent turned-down regions 302, 304. The grinding operation may, however, be constrained to a depth that is insufficient to provide a suitable stop surface; as such, another material may be applied to increase the size of the stop surface. for example, a thermal spray material (e.g., WEARSOX®) may be applied to increase the height of the stop member 306.

Figure 4:
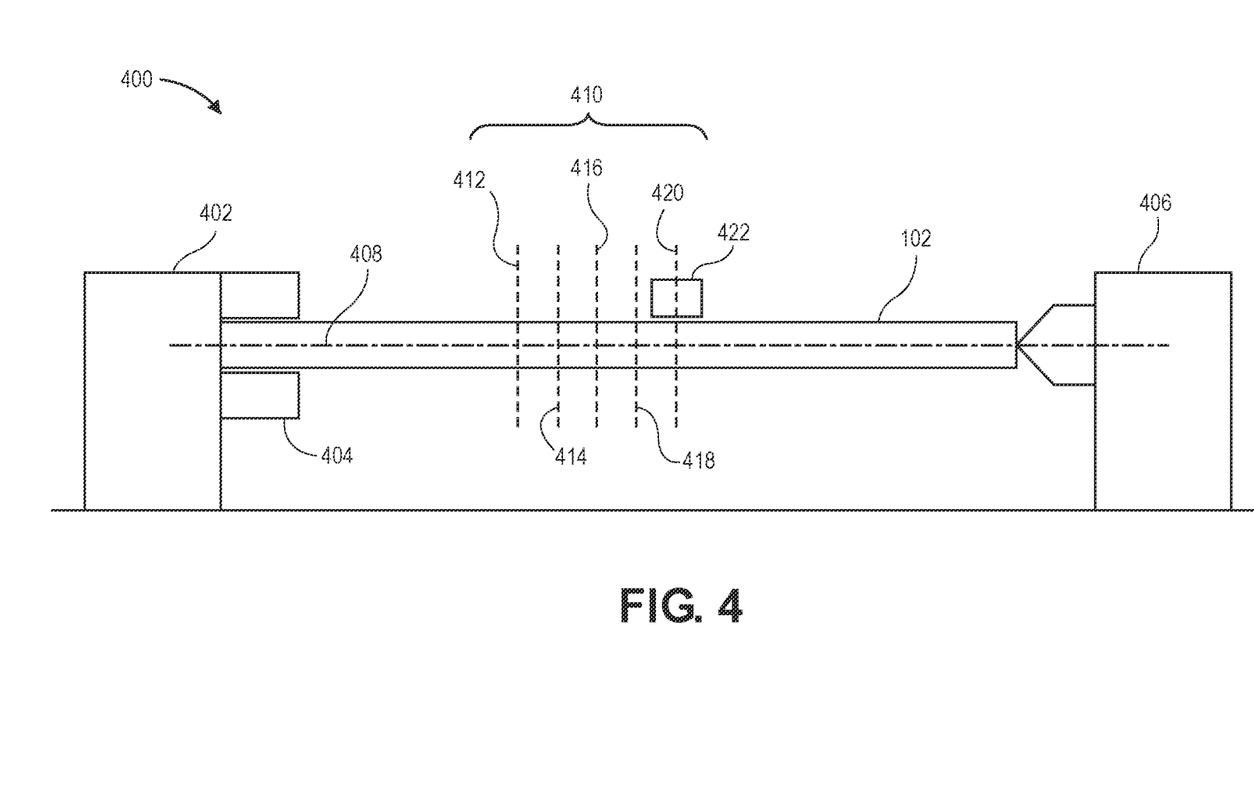
FIG. 4 illustrates a schematic view of a tubular positioned in an adjustable lathe for machining a turned-down region configured to accept the centralizer (or another cylindrical tool), according to an embodiment.

The turned-down region 108 of the tubular 102 may be formed using a lathe, in at least some embodiments. FIG. 4 illustrates a schematic view of the tubular 102 positioned in a lathe 400, for example. As shown, the lathe 400 includes a headstock 402 and a tailstock 406. The headstock 402 may include a plurality of jaws 404 that are configured to move toward one another and thereby grip the outer diameter surface of the tubular 102. In some embodiments, the jaws 404 could grip the inner diameter surface of the tubular 102 additionally or instead of the outer diameter surface. In a specific embodiment, four jaws 404 may be employed. The use of four jaws 404 may permit adjustment of the location of the center of the tubular 102 in the headstock 402. The rotation axis 408 for the headstock 402 may not change, and thus the movement of the four jaws 404 (e.g., in one or two axes) may permit the tubular 102 to be moved relative to the center of rotation.

The tailstock 406 may also be adjustable, e.g., independently of the headstock 402. Accordingly, the angle of the tubular 102, e.g., the angle at which it extends relative to horizontal between the headstock 402 and the tailstock 406. This may permit the tubular 102 to be positioned such that its central axis is coincident with the rotational axis 408, at least in the turned-down region 108, e.g., by tilting, adjusting the elevation or lateral position, or otherwise adjusting the tubular 102.

The thickness of at least a portion of the tubular 102 may be measured. For example, a turned-down or "skim" region 410 may be defined along at least a portion of the tubular 102. The thickness of the tubular 102 in one or more cross-sections (planes normal to the view) may be taken about the circumference of the tubular 102. For example, five such measurement planes 412-420 are shown, although it will be appreciated that any number of planes may be used. Larger number of measurement planes may permit for a smaller axial distance therebetween over the same length of skim region 410, and thus a more accurate representation of the tubular 102 in the skim region 410; however, this may come at the expense of time to prepare the tubular 102, and thus a reasonable trade-off in the number of measurement planes used may be selected. A measuring device 422 including one or more sensors may be employed to take the measurements, as will be described in greater detail below.

Figure 5:
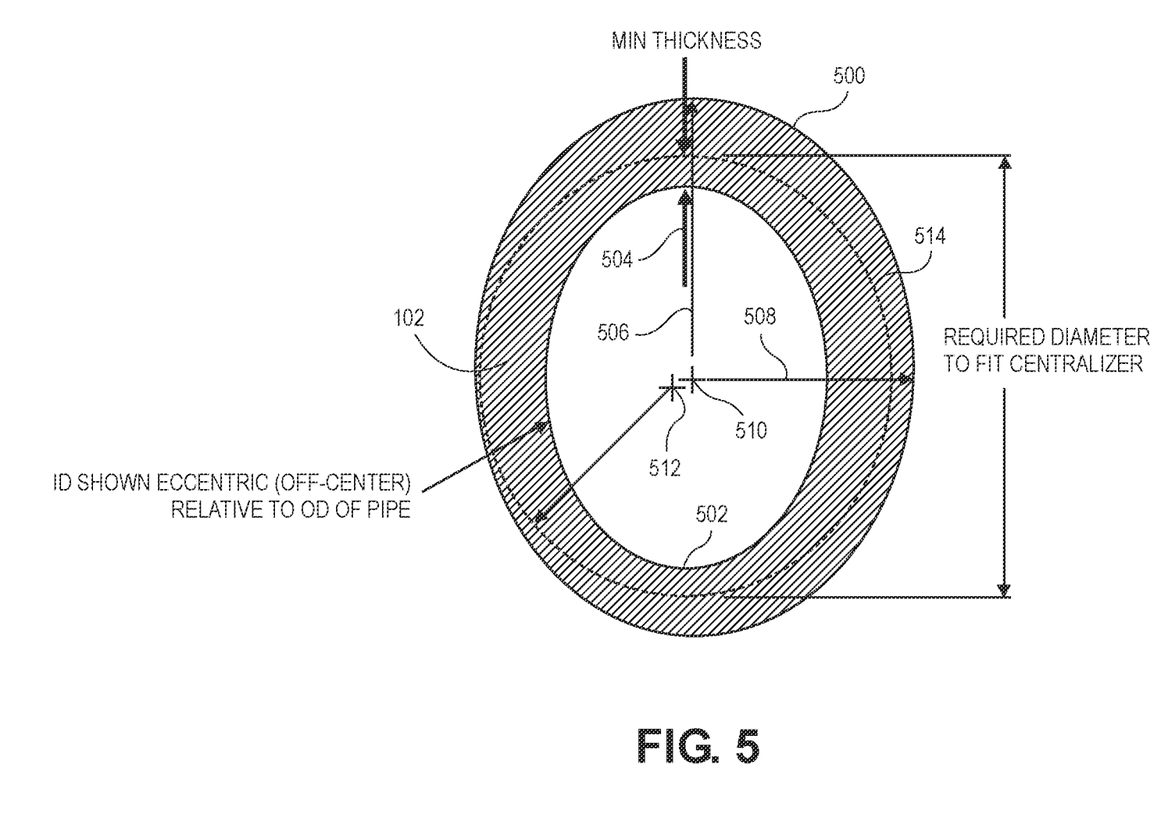
FIG. 5 illustrates a schematic view of a transverse plane of the tubular before a cutting process, according to an embodiment.

FIG. 5 illustrates a conceptual view of a transverse plane (e.g., axial cross-section) of the tubular 102, according to an embodiment. The tubular 102 may have an outer diameter surface 500 and an inner diameter surface 502. The distance between the outer and inner diameter surfaces 500, 502 at any given angle is the wall thickness 504, which, in some embodiments, may be maintained above a minimum value so as to maintain a burst or another strength rating. These inner and outer diameter surfaces 500, 502 may not be precisely circular, but rather have some degree of ellipticity, and thus a major axis 506 and a minor axis 508 may be defined. In some embodiments, the major and minor axes 506, 508 may be the same or different for the outer and inner diameter surfaces 500, 502. Further, the outer diameter surface 500 may have a center (or centerline) 510 that is different from a center 512 of the inner diameter surface 502.

As noted above, the jaws 404 of the lathe 400 may grip the outer diameter surface 500 (or inner diameter surface 502) to perform a machining operation to reduce the outer diameter of the tubular 102. The position of the tubular 102 may thus be adjusted (e.g., in two axes and tilted along a third axis) such that the rotational axis 408 extends through the center 512 of the inner diameter surface 502. The cutting element of the lathe 400 may thus machine the outer diameter surface 500 into the more circular (lower ellipticity) outer diameter surface 514 in the turned-down region 108. The outer diameter surface 514 has a generally constant radius extending from its center 512 at any angle. Further, the outer diameter surface 514 has its center at the location of the center 512 of the inner diameter surface 502. This permits the cylindrical tool (e.g., centralizer 518) to be fit onto the turned-down region 108 without cutting into the tubular 102 along the minor axis 508 more than is necessary for the centralizer 118 to fit around the outer diameter surface 514.

Thus, the ellipticity of the outer diameter surface 514 is reduced in the turned-down region 108; that is to say, the radii along minor axis 508 and the major axis 506 become closer to (if not precisely) equal. The term "ellipticity" is used herein qualitatively to refer to the inverse of how close to a circle that a particular elliptical cross-section is. Ellipticity (e) may also be defined mathematically as:

$$e = \sqrt{\frac{a^2 - c^2}{a^2}}$$

where a refers to the radius along the major axis 506, and c refers to the radius along the minor axis 508. Thus, as the radii a and c converge, ellipticity reduces toward zero.

Figure 6A:
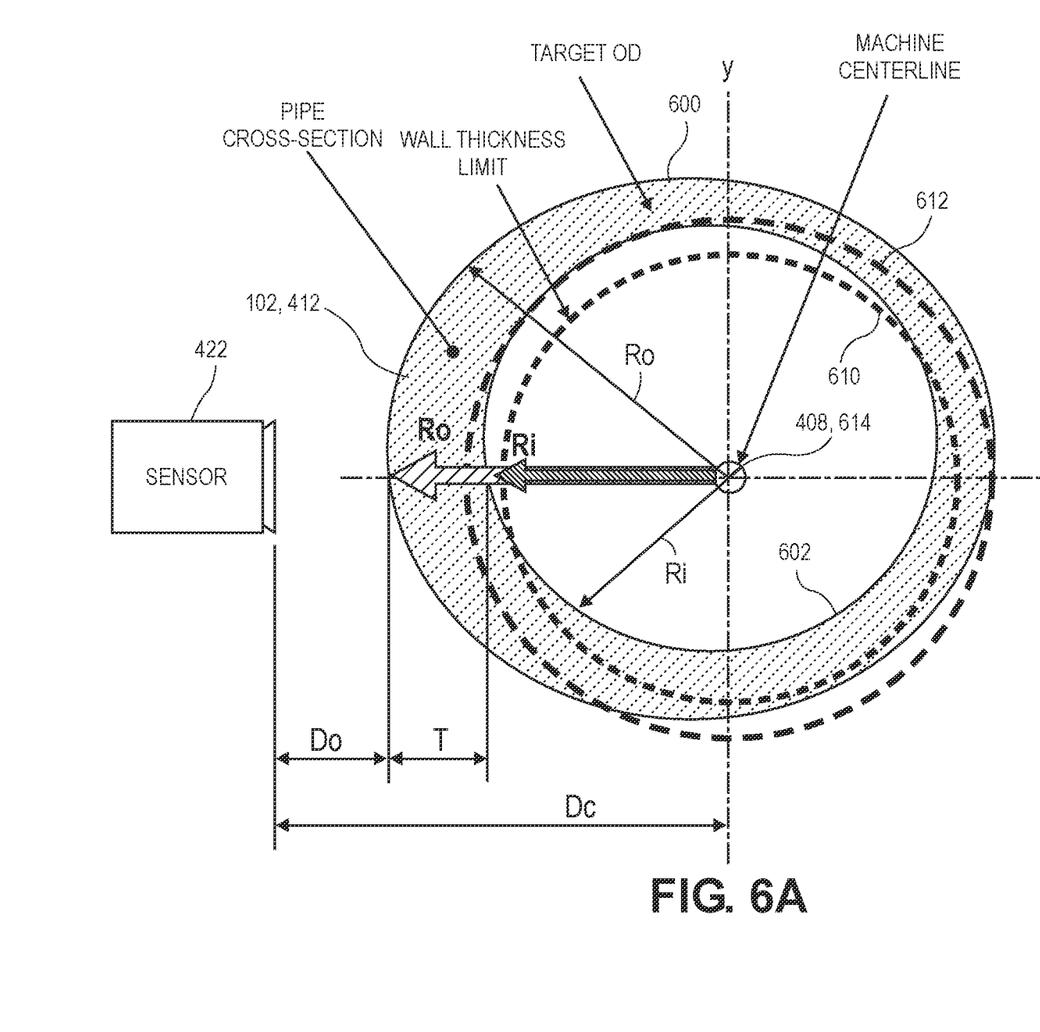
FIGS. 6A and 6B illustrate two transverse planes of the tubular, with a plot of a target or maximum outer diameter and minimum thickness overlayed thereon, according to an embodiment.

FIG. 6A illustrates a schematic view of the tubular 102 at one of the cross-sectional, transverse measurement planes (e.g., plane 412), according to an embodiment. As shown, the measurement device 422 is brought into proximity of an outer diameter 600 of the tubular 102 and is configured to measure the thickness T thereof, e.g., using an ultrasonic signal that reflects from the interface formed by the inner diameter 602. The measurement device 422 may also include an optical sensor that measures the distance Do between the device 422 and the outer diameter 600 of the tubular 102. The position of the measurement device 422 may also be fixed at a known distance Dc from a rotational centerline 606 of the lathe 400. The radius Ro of the outer diameter 600 may thus be calculated as the difference between the distance Do and the distance Dc. Further, the radius Ri of the inner diameter 602 may be calculated as the distance Dc minus the distance Do and minus the thickness T.

Because the cross-section of the tubular 102 is not uniform in thickness as proceeding circumferentially around the tubular 102, the tubular 102 may not meet the wall thickness specifications if the tubular 102 is machined with the centerline of the tubular 102 (specifically, as discussed above, the center of the outer diameter surface 600) being the same as the rotational axis 408 of the lathe 400.

Plots of minimum wall thickness specification 610 as a function of position and target outer diameter 612 are shown overlayed on the transverse plane (axial cross-section) of the tubular 102. It will be appreciated that the minimum wall thickness plot 610 is not necessarily representative of a location of the inner diameter 602; rather, the minimum wall thickness plot 610 represents, by way of distance from the origin 614, which is coincident with the rotational axis 408, the minimum wall thickness at any position around the circumference of the tubular 102. The minimum thickness may be constant around the circumference of the tubular 102. Since the thickness T is being measured, and not necessarily the location of the inner diameter surface, while the inner diameter surface location may be inferred, reference to the thickness measurement T may be more precise. Further, the inner diameter surface 602 may not be precisely circular, but, as discussed above, may have some degree of ellipticity, in contrast to the circular minimum thickness measurement plot 610.

The target outer diameter 612 may be determined based on the specifications of the application, e.g., the maximum tolerable outer diameter to fit the centralizer. Thus, it is seen that, if the tubular 102 or the lathe 400 is not adjusted, the machining operation would fail to maintain the required thickness, e.g., in the upper left quadrant, where the target outer diameter 612 is radially inward of the inner diameter 602.

Figure 6B:
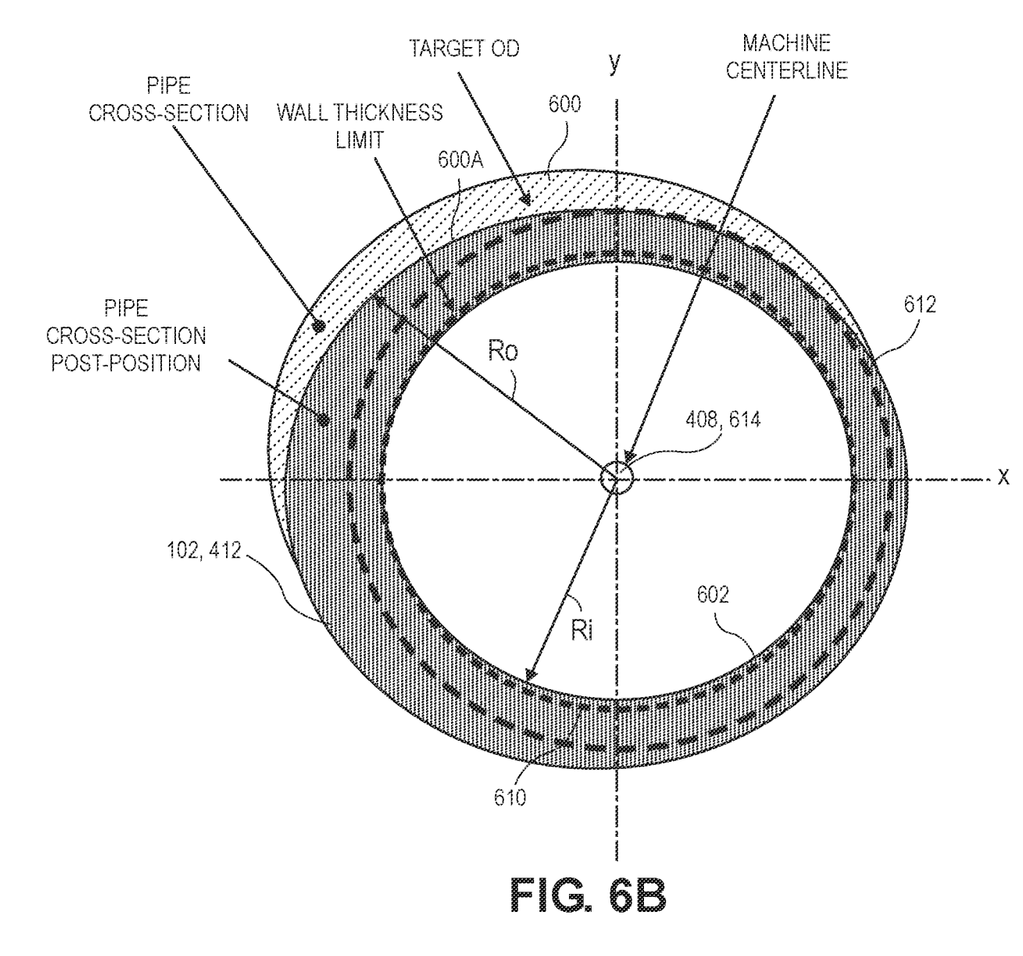

Accordingly, advancing now to FIG. 6B, the lathe 400 and/or tubular 102 may be adjusted so as to reposition the tubular 102 with respect to the rotational axis 408. In particular, the tubular 102 is moved radially with respect to the rotational axis 408, such that the original outer diameter 600 is now moved to a new position 600A. In this new position, the target outer diameter 612, e.g., after cutting operations have completed, is within the cross section of the tubular 102 wall, and, moreover, the minimum thickness is realized around the tubular 102. The centerline of the inner diameter surface 602 may or may not be collinear with the rotational axis 408.

Figure 7:
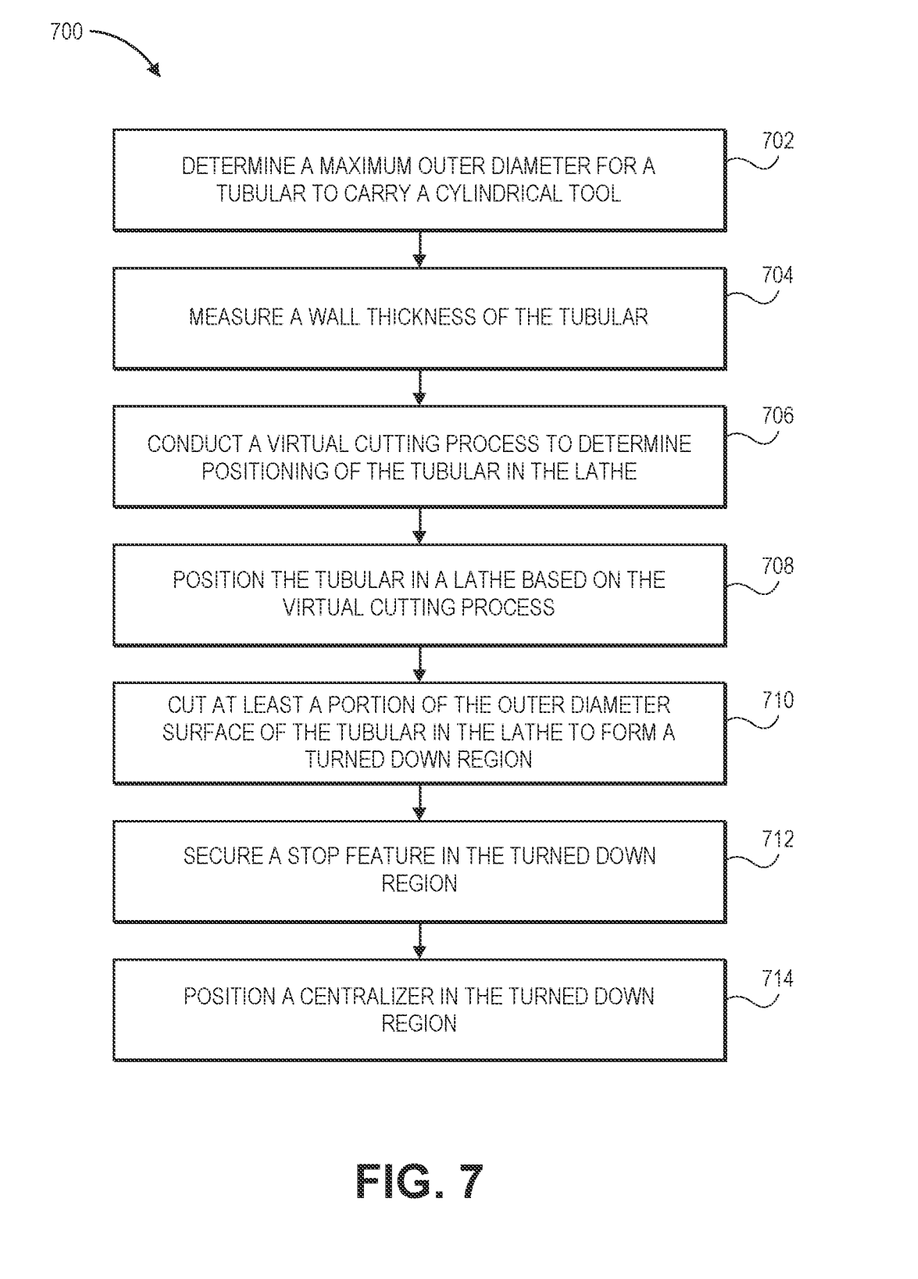
FIG. 7 illustrates a flowchart of a method for positioning a tool on a tubular (e.g., casing joint), according to an embodiment.

FIG. 7 illustrates a flowchart of a method 700 for positioning a tool on a tubular 102, according to an embodiment. The method 700 may include determining a maximum outer diameter for a tubular 102 to carry a cylindrical tool (e.g., centralizer 118), as at 702. In some embodiments, this maximum outer diameter may be less than a nominal outer diameter of the tubular 102, and thus cutting the tubular 102 may be called for. In some embodiments, the maximum outer diameter may be received as input.

Before cutting the tubular 102, a thickness 504 of the wall of the tubular 102 may be measured, as at 704, e.g., using a measurement device 422, such as an ultrasonic measuring device. The measurement device 422 may be configured to detect the thickness 504 of the wall at any point along the tubular 102, e.g., at 1 degree (or smaller) intervals. The tubular 102 may thus be surveyed or "mapped" at multiple points, e.g., forming a point cloud, so as to determine the dimensions of the tubular 102, e.g., in many transverse planes 412-420. The measurement device 422 may initiate measurements at a "null" point, or angular position, and then move around the tubular 102 so as to measure many points within a transverse or "measurement" plane 412. The position of the outer diameter surface of the tubular 102 and the thickness T at each point may be stored and employed in subsequent steps.

Based on the measurements taken, a "virtual cutting" process may be conducted, in which cutting into the outer diameter surface of the tubular 102 is simulated, as at 706. The virtual cutting process may be based on the outer diameter specified for the application, as well as the minimum thickness specification. In at least some embodiments, the virtual cutting process may simulate machining the tubular 102 at one or more axial positions in order to determine whether the tubular 102 can be, and where it should be, positioned for turn-down operations in order to meet both the maximum outer diameter and minimum thickness specifications. In particular, the virtual cutting process may determine an offset between the centerline of the outer diameter surface of the tubular 102 and the rotational axis 408 of the lathe 400.

For example, a certain minimum thickness for the tubular 102 may be required to meet burst ratings in specific applications. The virtual cutting process may be configured to determine a position for the tubular 102 in the lathe 400 at each individual measurement plane 412-420 in the skim region 410. This may be conducted, for example, as discussed about with respect to FIGS. 6A and 6B by comparing the target outer diameter with the position of the cross-section and the minimum thickness required. If the minimum thickness is not achieved, or if there is an offset that achieves a greater thickness, the virtual cutting process may determine to adjust the lathe 400 such that the center of the tubular 102 (particularly the inner diameter thereof) is offset from the rotational axis 408. Such determination may be made for each individual measurement plane 412-420. Constraints may be placed on how far the tubular 102 may be moved as between successive individual measurement planes 412-420, e.g., to avoid large steps or shoulders being formed in the skim region 410. In at least some embodiments, the centerline 510 defined by the outer diameter of the tubular 102 may be brought into alignment with the rotational axis 408 by removing a portion of the outer diameter surface in the skim region 410.

In some embodiments, the virtual cutting process may generate a plane wall map. For example, the virtual cutting process may receive, as input, target dimensions for the skim region 410 after cutting, e.g., final (target) outer diameter (e.g., about 9.875 in to about 16 inches), axial length (e.g., about 25 in to about 30 in), minimum allowable remaining body wall (e.g., about 87.5% to about 90%) for the skim region 410. These target dimensions may be compared to the wall profile, e.g., using a pipe coordinate system (e.g., polar coordinates, as discussed above, (x, r, theta)). The theta may be a null line at a selected zero degree point predefined on the pipe, which may be drawn or scribed by an operator.

In at least some embodiments, the virtual cutting process may define transverse plane wall maps corresponding to the individual measurement planes 412-420, which may include outer diameter profile, inner diameter profile, and wall thickness. The virtual cutting process may also define longitudinal plane wall maps, depicting a longitudinal (parallel to the centerline 510) cross-section of the tubular 102, and also include the inner diameter profile, outer diameter profile, and wall thickness at a certain angular orientation extending along the centerline 510 through, e.g., the skim region 410. The virtual cutting process also "virtually machine", i.e., simulate a cutting process at one or more transverse planes and at one or more rotational positions for the tubular 102. Reports such as minimum measured wall thickness, maximum measured wall thickness, average measured wall thickness, eccentricity, transverse plane visualization, longitudinal plane visualization (parallel to longitudinal axis of tubular 102), location of points in the pipe coordinate system, etc.

Figure 8:
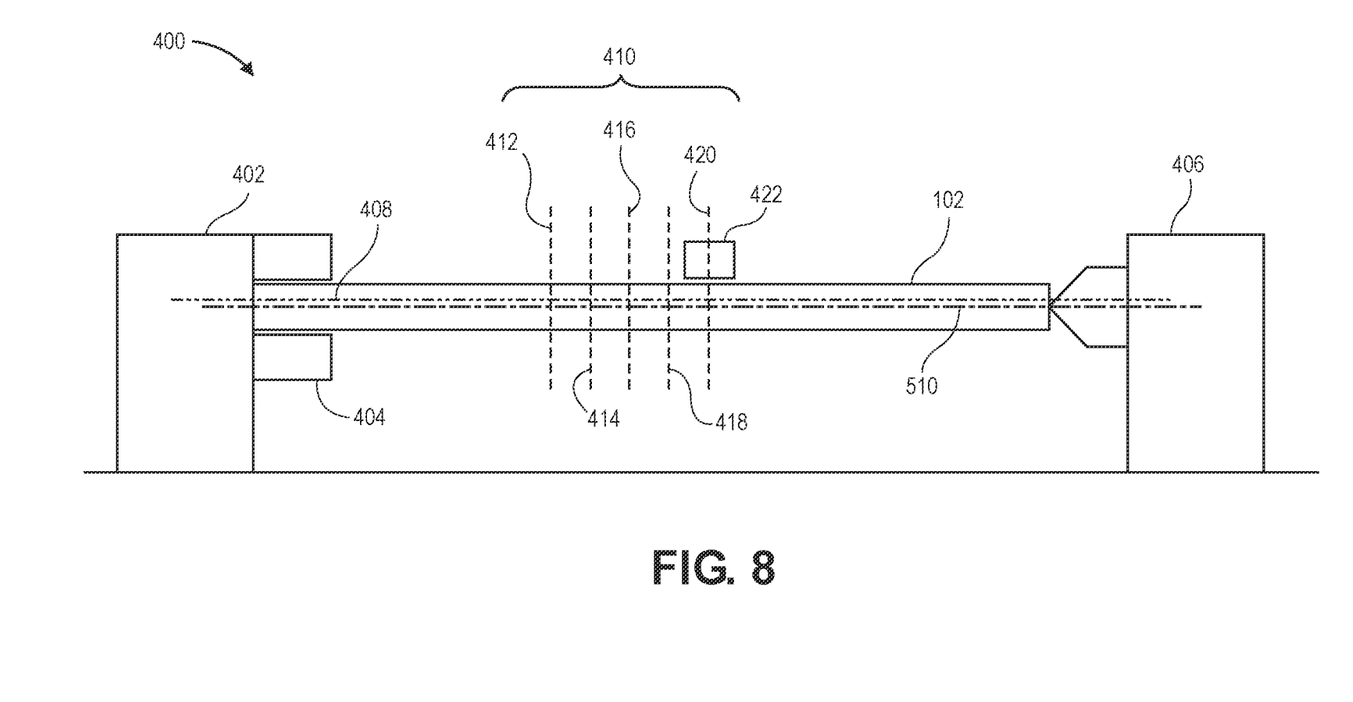
FIG. 8 illustrates a schematic view of the tubular positioned in the adjustable lathe such that the rotational axis of the tubular is offset from and parallel to the central axis of the inner diameter thereof, according to an embodiment.
Figure 9:
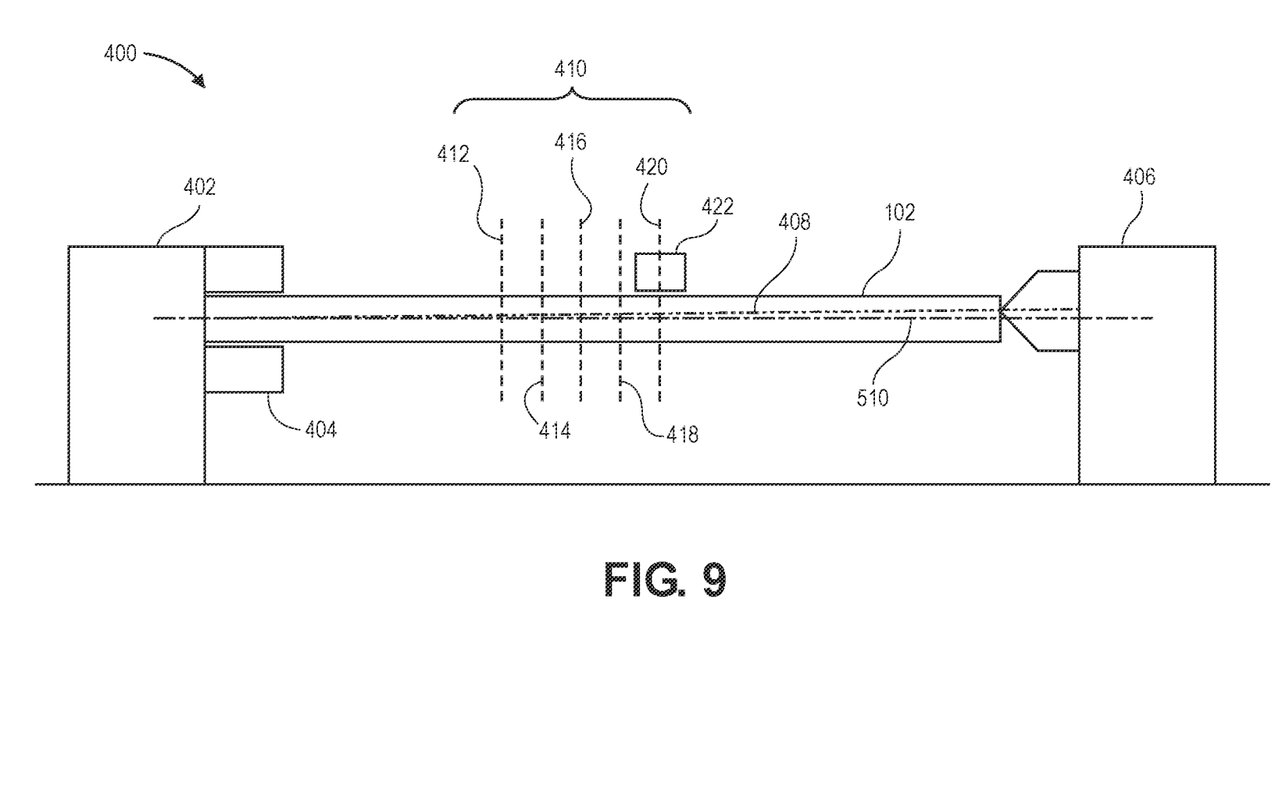
FIG. 9 illustrates a schematic view of the tubular positioned in the adjustable lathe such that the rotational axis is non-parallel with the central axis of the inner diameter, according to an embodiment.

Referring now to FIG. 8, in some embodiments, the virtual cutting process may prescribe offset amounts and directions for the rotational axis 408 of the lathe 400 and the centerline 510 of the tubular 102. The selected offset amounts and directions may be selected to ensure minimum wall thickness. The rotational axis 408 may be offset from the centerline 510, which may induce an orbiting of the centerline 510 around the rotational axis 408 as the tubular 102 is turned in the lathe 400. In particular, the tubular 102 may be shifted such that the areas of greater thickness are farther away from the rotational axis 408. Additionally, as shown in FIG. 9, the centerline 510 of the tubular 102 may also be angled with respect to the rotational axis 408, such that the cutting depth of a tool held at a constant distance from the rotational axis 408 would reach a different cutting depth in the tubular 102 depending on the axial position of the tool along the tubular 102. This may be accomplished by moving the headstock 402 or the tailstock 406 relative to the other, so as to move one end of the tubular 102 out of alignment with the rotational axis 408.

The cutting tool of the lathe 400 may be positioned at a stationary or fixed distance from the rotational axis 408, and thus this orbiting, at least initially, may result in unequal cutting of the outer diameter of the tubular 102. As a consequence, areas of greater thickness in the tubular 102 may be machined first and to a greater extent, given the shifted position. Some small amount of material may be removed from the entire cross-section, e.g., in order to maintain circularity of the outer diameter surface of the tubular 102. Moreover, as discussed above, the measurements may be taken at multiple cross-sectional positions (transverse planes) 412-420. Accordingly, the process at 706 may prescribe multiple adjustments to the lathe 400, e.g., upon reaching a desired cutting depth at each plane 412-420, so as to maintain the minimum thickness in the individual planes 412-420. As such, a stepped profile may be developed along the skim region 410. In other embodiments, the process at 706 may be configured to generate a continuous movement of the cutting element or the jaws 404/headstock 402 so as to prescribe a smooth transition between the measurement planes 412-420. For example, an interpolation could be made between the position of the tubular 102 relative to the cutting tool as between the measurement planes 412-420 so as to generate a continuous profile in the tubular 102 that achieves the prescribed cutting profiles (referring to the position of the outer diameter surface 600 relative to the inner diameter surface 602) in each of the measurement planes 412-420.

Based on the prescribed positions derived in the virtual cutting process, the method 700 may proceed to positioning the tubular 102 in the lathe 400, as at 708. Referring again to FIG. 4, the jaws 404 may grip the outer diameter surface 500 of the tubular 102, and a travel indicator may be positioned on the outer diameter surface 500 prior to cutting. As described above, the lathe 400 may be adjusted to accommodate departures from cylindrical in the geometry of the tubular 102. In particular, the center 512 of the inner diameter surface 502 may not be the same as the center 510 of the outer diameter surface 500, and thus the lathe 400 may position the tubular 102 such that the center 512 of the inner diameter surface 502 is radially aligned with the rotational axis 408, e.g., by moving the headstock 402 and/or the tailstock 406 of the lathe 400. In an embodiment employing a mill rather than a lathe, programming could be used to affect the y-axis of the mill instead of adjusting the tubular 102 in the lathe 400. As a result of this positioning and cutting, the center 512 of the outer diameter surface 514 may be radially offset from the center 510 of the outer diameter surface 500 away from the turned-down region 108. In other embodiments, e.g., such as described above with reference to FIGS. 6A and 6B, the tubular 102 may be positioned in the lathe 400 based on plots of target outer diameter and minimum wall thickness.

The method 700 may then proceed to cutting at least a portion of the outer diameter surface 500 of the tubular 102 in the lathe 400 (or a mill or another machining device) to form the turned-down region 108, as at 710. The result is shown in FIG. 5, for example, as outer diameter surface 514, which has the same center 510 as the inner diameter surface 502, and thus a different center from the outer diameter surface 500 away from the turned down region 108 (e.g., at an axial location that is outside of or adjacent to the turned-down region 108). Further, the ellipticity of the outer diameter surface 514 is reduced as compared to the outer diameter surface 500 outside of the turned-down region 108, while the ellipticity of the inner diameter surface 502 is unchanged (since it is not cut) and thus greater than the ellipticity of the outer diameter surface 500 away from the turned-down region 108.

In some embodiments, an optional stop member 306 may be secured in the turned-down region 108, as at 712. Further, a centralizer 118 or another cylindrical tool may then be positioned in the turned-down region 108, as at 714.

Figure 10:
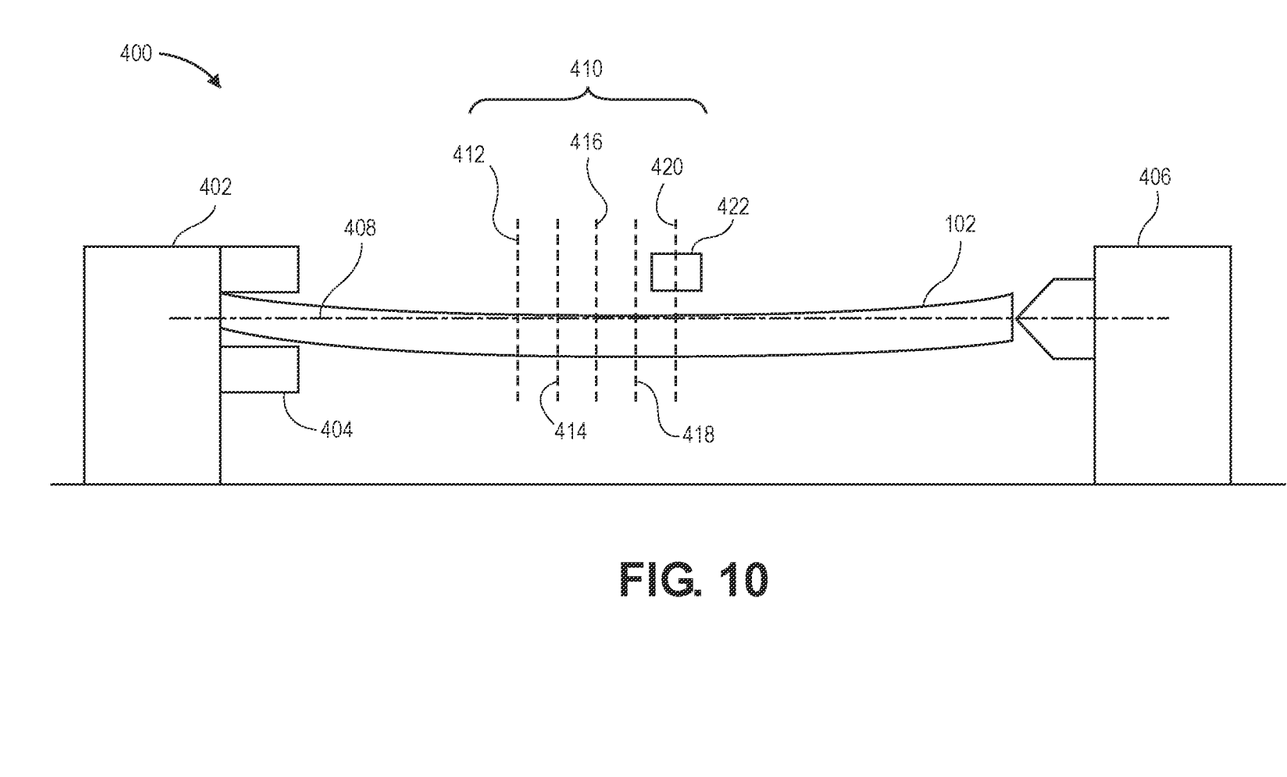
FIG. 10 illustrates a schematic view of the tubular having an axial curve (bend) and positioned in the adjustable lathe, according to an embodiment.

As noted above, the lathe 400 may not maintain a single position for the entire cutting process, but may reposition the tubular 102, e.g., one or more times to achieve a desired cutting profile at each of the measurement planes 412-420. Further, in some embodiments, the method 700 may be configured to account for non-straight in the tubular 102. As shown in FIG. 10, the tubular 102 may be bowed or axially curved. The curved geometry may not be as severe as shown, as this illustration may reflect an exaggeration for illustrative purposes. Further, the geometry may be more complex than a single bow, but may be curved two or more times as proceeding along its axis, potentially in any direction.

To account for such curved geometry, the curvature may be measured, e.g., using lasers or other measuring implements positioned incrementally along the length of the tubular 102. This may occur, for example, before other steps of the method 700, or in between or simultaneous therewith, prior to cutting at 710. The lasers may measure a lateral displacement of the tubular 102 along the length thereof, providing a map of the curvature. If the curvature is beyond a threshold, the tubular 102 may be rejected from consideration for cutting, as it may not be able to be machined to within a desired outer diameter, while also being straight enough to receive a close-tolerance, low-clearance centralizer, depending on the application. If the curvature is not beyond the threshold, the thickness of the tubular 102 may be measured at multiple axial planes 412-420, as discussed above, and machined so as to meet the outer diameter and thickness requirements of the application.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for positioning a downhole tool on a tubular, comprising:
    measuring a thickness and a location of an outer diameter surface of the tubular at a plurality of transverse planes of the tubular;
    simulating a cutting process to determine a position for the outer diameter surface of the tubular in a lathe, such that, after the cutting process that was simulated is conducted, the thickness of the tubular is greater than a minimum thickness and an outer diameter defined by the outer diameter surface of the tubular is less than or equal to a maximum diameter, wherein simulating the cutting process comprises simulating the cutting process at each of the plurality of transverse planes, and wherein simulating the cutting process comprises determining an offset between a center of the tubular at the respective transverse planes and a rotational axis of the lathe;
    positioning the tubular in the lathe based on the simulation of the cutting process;
    cutting the outer diameter surface of the tubular so as to reduce the outer diameter thereof to at most the maximum diameter and thereby form a turned-down region; and
    positioning the downhole tool on the tubular in the turned-down region.

2. The method of claim 1, wherein cutting the outer diameter surface comprises reducing an ellipticity of the outer diameter surface of the tubular in the turned-down region.

3. The method of claim 1, wherein an inner diameter surface of the tubular is not cut as part of cutting the outer diameter surface.

4. The method of claim 1, wherein, after cutting, a center of an inner diameter surface of the tubular is the same as a center of the outer diameter surface in the turned-down region.

5. The method of claim 1, wherein positioning comprises continuously adjusting the lathe while cutting between the transverse planes so as to form smooth transitions therebetween.

6. The method of claim 1, wherein measuring comprises using an ultrasonic measuring device to measure the thickness and an optical sensor to measure a position of the outer diameter surface of the tubular.

7. A method for positioning a downhole tool on a tubular, comprising:
    measuring a thickness and a location of an outer diameter surface of the tubular at a plurality of transverse planes of the tubular;
    simulating a cutting process to determine a position for the outer diameter surface of the tubular in a lathe, such that, after the cutting process that was simulated is conducted, the thickness of the tubular is greater than a minimum thickness and an outer diameter defined by the outer diameter surface of the tubular is less than or equal to a maximum diameter;
    positioning the tubular in the lathe based on the simulation of the cutting process;
    cutting the outer diameter surface of the tubular so as to reduce the outer diameter thereof to at most the maximum diameter and thereby form a turned-down region, wherein, after cutting, a first center defined by the outer diameter surface of the tubular in the turned-down region is radially offset from a second center defined by the outer diameter surface away form the turned-down region; and positioning the downhole tool on the tubular in the turned-down region.

8. A method for positioning a downhole tool on a tubular, comprising:

measuring a thickness and a location of an outer diameter surface of the tubular at a plurality of transverse planes of the tubular;

simulating a cutting process to determine a position for the outer diameter surface of the tubular in a lathe, such that, after the cutting process that was simulated is conducted, the thickness of the tubular is greater than a minimum thickness and an outer diameter defined by the outer diameter surface of the tubular is less than or equal to a maximum diameter;

positioning the tubular in the lathe based on the simulation of the cutting process;

cutting the outer diameter surface of the tubular so as to reduce the outer diameter thereof to at most the maximum diameter and thereby form a turned-down region;

adjusting the lathe so as to reposition the tubular after reaching one of the transverse planes; and positioning the downhole tool on the tubular in the turned-down region.

9. A method for positioning a downhole tool on a tubular, comprising:

measuring a thickness and a location of an outer diameter surface of the tubular at a plurality of transverse planes of the tubular;

simulating a cutting process to determine a position for the outer diameter surface of the tubular in a lathe, such that, after the cutting process that was simulated is conducted, the thickness of the tubular is greater than a minimum thickness and an outer diameter defined by the outer diameter surface of the tubular is less than or equal to a maximum diameter;

displaying a visualization of the minimum thickness in a circular plot and the location of the outer diameter surface in a circular plot;

positioning the tubular in the lathe based on the simulation of the cutting process;

cutting the outer diameter surface of the tubular so as to reduce the outer diameter thereof to at most the maximum diameter and thereby form a turned-down region; and positioning the downhole tool on the tubular in the turned-down region.

10. A method for positioning a downhole tool on a tubular, comprising:

measuring a thickness and a location of an outer diameter surface of the tubular at a plurality of transverse planes of the tubular;

simulating a cutting process to determine a position for the outer diameter surface of the tubular in a lathe, such that, after the cutting process that was simulated is conducted, the thickness of the tubular is greater than a minimum thickness and an outer diameter defined by the outer diameter surface of the tubular is less than or equal to a maximum diameter;

determining an axial curvature of the tubular prior to cutting, wherein simulating comprises simulating adjusting the position of the tubular based at least in part on the axial curvature;

positioning the tubular in the lathe based on the simulation of the cutting process;

cutting the outer diameter surface of the tubular so as to reduce the outer diameter thereof to at most the maximum diameter and thereby form a turned-down region; and positioning the downhole tool on the tubular in the turned-down region.

11. A method for positioning a downhole tool on a tubular, comprising:

measuring a thickness and a location of an outer diameter surface of the tubular at a plurality of transverse planes of the tubular;

simulating a cutting process to determine a position for the outer diameter surface of the tubular in a lathe, such that, after the cutting process that was simulated is conducted, the thickness of the tubular is greater than a minimum thickness and an outer diameter defined by the outer diameter surface of the tubular is less than or equal to a maximum diameter;

determining the maximum diameter for the tubular based on a size of the downhole tool;

determining whether the outer diameter surface of the tubular can be cut to be no larger than the maximum diameter while maintaining the minimum thickness;

positioning the tubular in the lathe based on the simulation of the cutting process;

cutting the outer diameter surface of the tubular so as to reduce the outer diameter thereof to at most the maximum diameter and thereby form a turned-down region; and positioning the downhole tool on the tubular in the turned-down region.

12. A method for positioning a downhole tool on a tubular, comprising:

measuring a thickness and a location of an outer diameter surface of the tubular at a plurality of transverse planes of the tubular;

simulating a cutting process to determine a first radial position for the tubular at a first transverse plane of the plurality of transverse planes, and a second radial position for the tubular at a second transverse plane of the plurality of transverse planes, the first and second radial positions being radially offset, wherein the first and second radial positions are selected such that, after the cutting process that was simulated is conducted, the thickness of the tubular at the first and second transverse planes is greater than a certain minimum thickness and an outer diameter defined by the outer diameter surface of the tubular is less than or equal to a certain maximum diameter;

positioning the tubular in a lathe at the first radial position, based on the simulation of the cutting process;

cutting the outer diameter surface of the tubular so as to reduce the outer diameter thereof to at most the certain maximum and thereby form a turned-down region;

adjusting the position of the tubular, after reaching the first transverse plane, to the second radial location;

cutting the outer diameter surface of the tubular after adjusting the position; and positioning the downhole tool on the tubular in the turned-down region.

* * * * *